United States Patent

[11] 3,558,023

[72] Inventor Kikuchi Yoshito
 Nishinomiya, Japan
[21] Appl. No. 822,265
[22] Filed May 6, 1969
[45] Patented Jan. 26, 1971
[73] Assignee Tiger Vacuum Bottle Industrial Company, Limited
 Kadoma, Osaka Prefecture, Japan
[32] Priority May 8, 1968
[33] Japan
[31] 43/38,026 and 43/38025

[54] LID ACTUATING DEVICE
 10 Claims, 6 Drawing Figs.
[52] U.S. Cl..................................................... 222/556, 220/94
[51] Int. Cl..................................................... B65d 47/00, B65d 25/28

[50] Field of Search........................................... 222/556, 517; 220/94; 215/13A

[56] References Cited
UNITED STATES PATENTS

| | | | |
|---|---|---|---|
| 3,130,856 | 4/1964 | Gits............................. | 220/94—A |
| 3,321,115 | 5/1967 | Rendahl........................ | 222/556—X |

*Primary Examiner*—Raphael H. Schwartz
*Attorney*—Holman and Stern

ABSTRACT: A container is provided with a lid supported on the container case in the manner of a lever and a press member pivoted to an upper end portion of a handle. The press member has two stepped portions to be brought into engagement with the end of lever on the lid. When the press member is depressed in normal operation, the lid is opened to such an extent that the contents can be poured out and when further depressed, the press member brings the lid to full-opened position.

PATENTED JAN 26 1971

INVENTOR.
YOSHITO KIKUCHI
BY Holman, Glasock,
Downing & Seebold
ATTORNEYS

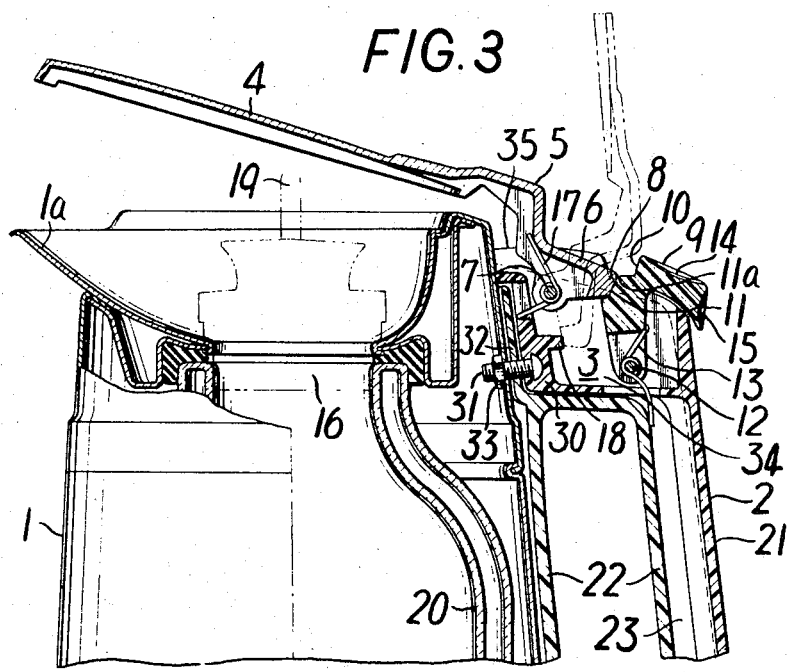
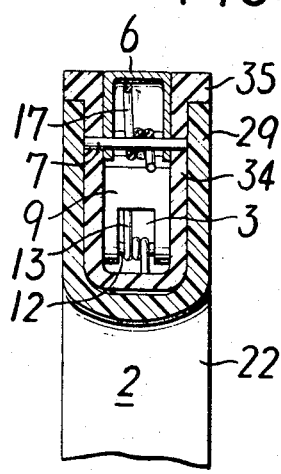
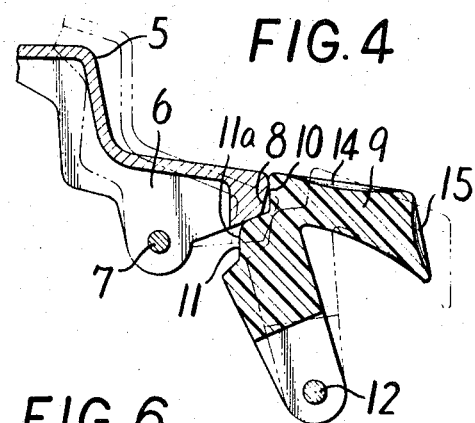
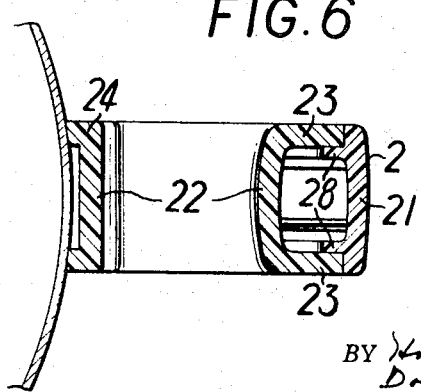

LID ACTUATING DEVICE

The present invention relates to a device for opening or closing a lid of a container, preferably a vacuum bottle, jug or the like for keeping the contents hot or cold, which can be operated by a single hand. More particularly, the present invention relates to a lid opening device which is provided with means for opening or closing the lid by two steps depending upon the purpose of the operation.

With an already known jug or vacuum bottle in which the closure of a bottle containing the contents is removed manually every time it is used, the lid supported in a leverlike manner is made to open wide by the thumb of a hand grasping the handle of the main body. In case of a jug or a vacuum bottle which is so adapted that the closure inserted in the mouth of an inner bottle containing the contents is removed manually every time the contents are poured out, an end of the lid hingedly mounted in the manner of a lever is pressed on by the thumb of a hand grasping the handle of the main body to open the lid by one step.

With a vacuum bottle in which the closure used on the mouth of inner bottle is provided with a valve which is adapted to be opened or closed, for instance, by a valve to be closed due to the weight of the lid or by a valve of a float type, the above-mentioned valve is automatically opened to pour out the contents when the main body is lifted and tilted by the hand, so there is no need to open the lid thereover to a great extent. It is when the above closure is removed to supply fresh contents into the bottle that the lid has to be opened wide.

An object of the present invention is to provide means by which the lid of a vacuum bottle having a so-called automatic closure can be readily operated by the thumb the lid thereby being adapted to be completely opened in two steps, the first in which the lid is opened or closed a small amount, and the other step in which it is opened or closed a large amount.

Another object of the present invention to provide a vacuum bottle having covering lid which can be opened or closed by operating a press member when the lid is to be opened or closed a small amount for ordinary use, the press member further being so adapted that the lid can be retained in the half-opened position or can be opened to the greatest extent as desired through the operation of the same press member, the vacuum bottle thus being made very convenient to use.

A further object of the present invention is to facilitate assemblage of a handle in which the above-mentioned means for opening or closing operation is provided, without externally exposing the ends of pivot member of the means.

Other features and advantages of the present invention will become apparent from the following detailed description with reference to the accompanying drawings, in which:

FIG. 3 is a view similar to FIG. 2 showing the relationship between a press member and a tail end portion of a lever of the lid;

FIG. 5 is a sectional view along the line V-V in FIG. 2 as seen in the direction of an arrow; and FIG. 6 is a plan view in cross section taken along the line VI-VI in FIG. 2.

Figure 1:
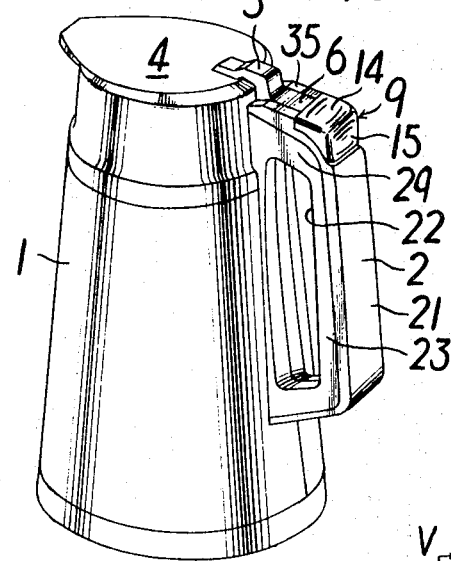
FIG. 1 is an external view of an embodiment of the present invention as it is applied to a vacuum bottle to be used on the table.
Figure 2:
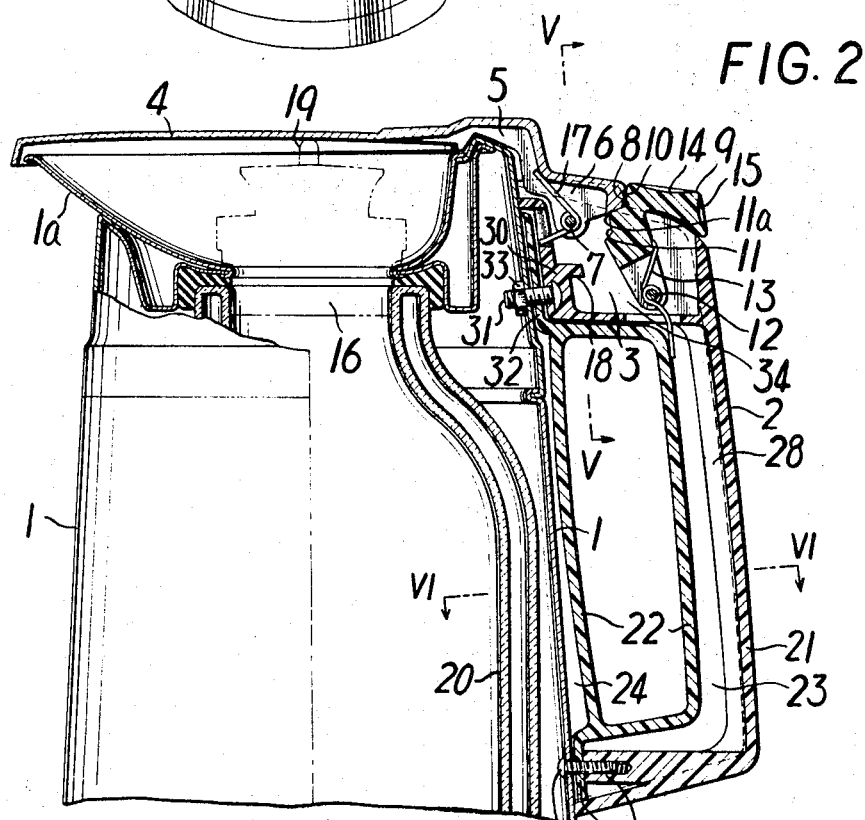
FIG. 2 is a side elevation showing a handle and a lid of the vacuum bottle in section.

Referring to FIGS. 1 and 2, a case 1 is provided with a lip 1a in the upper portion as already known. In an upper portion of a handle 2 fixed to a side portion of the case 1, there is formed a recess 3. On the sidewall 34 in the recess 3 is mounted by a pivot 7 a tail end 6 of a lever 5 formed at a side of a lid 4. On a portion of the recess 3 and a portion of the lever 5 is acting a spring 17 which is exerting its force in a direction to open the lid 4. At a different position on the wall 34 of recess 3 there is disposed a press member 9 mounted on a pivot 12. In mating relationship with a rear end 8 of the lever 5, the press member 9 is formed with first and second stepped portions 10 and 11 which are formed in continuous shape. Between the first and second stepped portions 10 and 11 there is formed a cam 11a for pushing up the rear end 8 of the lever, and a spring 13 serving to push the rear end 8 is acting on the press member 9.

In the above structure, the stepped portions 10, 11, cam 11a and tail end 8 of the lever 5 are so formed that when the rear end 8 is held in engagement with the stepped portion 11 against the spring 17, the cam 11a may push up the lever rear end 8 in sliding contact therewith upon the press member 9 being pushed toward the lever 5, and that when the lid 4 is in closed position, the rear end 8 is in fitting contact with the upper stepped portion 10 of the press member 9 as shown in FIG. 2. Designated at 14 is a press portion formed in the upper surface of the press member 9; at 15, a push portion formed in a end portion of the press member 9; at 15, a closure of the bottle 20 having a valve and an operation stem 19 of the valve.

While the lid 4 is in closed position as shown in FIG. 2, the press member 9, when its press portion 14 is pressed on by the thumb, is turned clockwise against the spring 13 and the first stepped portion 10 gets released from the rear end 8 of the lever 5 as shown in FIG. 3. Upon this release, the lever 5 is turned clockwise by the spring 17 and the rear end 8 is brought into engagement with the lower stepped portion 11. When the press member 9 is thus positioned, the lid 4 is held open to an extent corresponding to the range of pivotal movement of the lever 5 effected as the lever rear end 8 moves from the upper stepped portion 10 to the lower stepped portion 11. In this position, shown in solid line in FIG. 3, the lid 4 is kept half-opened. When the lid 4 is brought to the half-opened position, the valve stem 19 of the closure 16 which is shown in virtual line in the present embodiment moves up to open the valve within the closure 16 and the contents are ready to pour out.

Next, when the press member 9 is turned counterclockwise by pushing up the push portion 15 of the press member 9, the cam 11a of the stepped portion 11 pushes the lever tail end 6 upward against spring 17 in sliding contact with the rear end 8 and, after assuming the position shown in virtual line in FIG. 4, brings the lid 4 to the original closed position shown in solid line. When the lid 4 is perfectly closed as shown in FIG. 1, the press member 9 holds the lever 5 in position with the upper stepped portion 10 in fitting contact with the rear end 8.

When the press portion 14 of the press member 9, as it is in the position shown in solid line FIG. 3, is further depressed to turn the press member 9 clockwise to the full against spring 13, the rear end 8 of the lever 5 gets released from the lower stepped portion 11, the lever 5 thereby being turned clockwise by a large angle to bring the lid 4 to the full-opened position, which is partially indicated in virtual line in FIG. 3. The full-opened position of the lid 4 at this time is defined by the rear end 8 as it is brought into contact with the stopper 18 formed in the recess 3 of the handle 2. With the lid 4 in full-opened position, the closure 16 carrying valve therein can be removed to discharge the hole contents at a time or to fill the container with a fresh liquid. To close the lid 4 which is in full-opened position, it is directly moved by the hand against the spring 17. At this time, due to the rotation of the lever 5, the press member 9 is pressed on at the inner side and pivotally moved. The lid 4 and press member 9 are returned to the position shown in FIG. 1. While the lid 4 is retained in half-opened or closed position with the rear end 8 in engagement with the lower stepped portion 11 or with the upper stepped portion 10, it is impossible to open the lid 4 manually since the rear end 8 is supported on the bottom surface of the stepped portion 10 or 11.

In accordance with the present invention, the handle 2 comprises an outer frame 21 and an inner frame 22 to be combined with the inner side of the former, a stiffener 23 U-shaped in section of the inner frame 22 covering the opposite sides of the outer frame 21 in combination therewith. The stiffener 23 extends along the opposite sides of the arm portion at the lower part of the outer frame 21. The inner frame 22 is also provided, on its side to be in contact with the bottle case 1, with a stiffener 24 in contact with the case. A seat portion 26 extends downwardly from this portion between the case and a fixing portion 25 at the lower end of the outer frame 21. These members are secured to the bottle case 1 by means of a screw 27. Designated at 28 in the drawing are ribs of outer frame 21 on which the stiffener 23 is externally fitted.

Although the previously-mentioned recess 3 for setting the press member 9 and the lever 5 of the lid is continuously formed with the outer frame 21, both of the sidewalls 34 of the recess 3 are covered with a wall 29 of upper extension of the inner frame 22. Indicated at 35 is an upper end of a wall 34 of the outer frame. In a fixing portion 30 at the upper part of the outer frame 21 which faces the case 1, a bolt 31 is implanted and the fixing portion 30 is secured to the case 1 by a nut 33 together with a set portion 32 of the upper part of the inner frame 22.

In accordance with the present invention, in case where the lid is opened or closed in a small range to pour out the contents in ordinary use, the lid is opened or closed by the operation of the press member which prevents full release of the lid, so that the lid can be readily operated only by a single hand which grasps the handle, thus remarkably facilitating the use of a container with a lid like a vacuum bottle. In addition, since the contents can be poured out when the lid is in half-opened position, the operation range for the press member to effect pouring is reduced to a small extent. The present invention therefore has an advantage that pouring operation even when repeatedly done can be effected readily.

The device is also convenient in that the lid can be retained in half-opened position or in full-opened position means of the same press member. Unless the press member is actuated, the lid is not opened and, in addition, the end of the press is member in the present embodiment defines the same plane as the surface of the handle, so that even if the container is tipped over or subject to external force, the liquid contents are prevented from begin unintentionally poured out.

In accordance with this invention, the opposite ends of pivots 7, 12 of the above-mentioned means provided in the upper portion of the handle 2 which are exposed on the wall 34 of recess 3 are almost covered with extending wall 29 of the inner frame 22, since the handle providing the means for opening or closing the lid is formed of a combination of the outer frame 21 and inner frame 22. Thus, as compared with a conventional structure in which the pivot ends are externally exposed, the above structure of this invention is simple in appearance and more effective in design. By providing a structure in which the operating portions 14 and 15 of the press member 9 are not projected externally from the handle as in the foregoing embodiment, the appearance of the handle can be made more simple. In case the outer frame and inner frame, each different in color, are assembled together, the color arrangement in the handle can be made more attractive in design. A double structure comprising outer frame 21 and inner frame 22 not only serves to cover the ends of pivots 7 and 12 but also renders the handle high in strength. Since the outer and inner frames are joined merely in fitting engagement and can be fixed to the case together, the structure is convenient to assemble.

I claim:

1. A container including an outer case having a lip at the upper portion thereof, a handle fixed to a side portion of said case, a recess formed in the upper portion of said handle, a rear end portion of a lid extending over said recess and pivoted to the wall of said recess with a restoring spring providing thereon, and a press member having two stepped engagement portions in mating relationship with said rear end portion and pivoted at another position on the wall of said recess with a restoring spring acting thereon.

2. A container as claimed in claim 1 wherein said restoring spring on the pivot of said rear end portion of the lid is so disposed as to continuously act in the direction to open the lid, said restoring spring acting on said press member is so disposed as to always bring said press member into resilient contact with said rear end portion of the lid, and a vacuum bottle being housed within said outer case in an effective communication with said lid.

3. A container as claimed in claim 1 wherein the first stepped engagement portion of said press member is so formed as to engage with the rear end of the lid as the lid is in closed position.

4. A container as claimed in claim 1 wherein the second stepped engagement portion of said press member is adapted to engage with the rear end of the lid as the lid is opened a small amount.

5. A container as claimed in claim 1 wherein between the first stepped engagement portion and the second stepped engagement portion of said press member is formed a cam for pushing up the rear end of the lid which is in sliding contact therewith.

6. A container as claimed in claim 1 wherein said press member is formed with a press portion in the upper part and a push portion in the side end part.

7. A container as claimed in claim 1 wherein said handle comprises and outer frame formed with the recess in the upper portion pivotally supporting said rear end portion of the lid and said press member, and an inner frame in fitting contact with the inner periphery of said outer frame, said handle being fixed to said case.

8. A container as claimed in claim 7 wherein upper and lower extensions of said inner frame are fixed to said case together with upper and lower fixing portions of said outer frame to secure said handle.

9. A container as claimed in claim 7 wherein said inner frame of said handle has a first stiffener set on the outer side of ribs of said outer frame and a second stiffener in contact with said case.

10. A container as claimed in claim 7 wherein the upper part of said inner frame of said handle has a portion covering the opposite sides of the wall of the recess of said outer frame.